(12) United States Patent
Xue et al.

(10) Patent No.: US 6,387,318 B1
(45) Date of Patent: May 14, 2002

(54) GLASS-CERAMIC PRESSURE SENSOR SUPPORT BASE AND ITS FABRICATION

(75) Inventors: Liang A. Xue, Randolph, NJ (US);
Anthony J. Bernot, Gilbert, AZ (US);
Grenville Hughes, Tucson, AZ (US);
Laura Lindberg, Tempe, AZ (US)

(73) Assignee: AlliedSignal, Inc., Morris Township, NJ (US)

( * ) Notice: Subject to any disclaimer, the term of this patent is extended or adjusted under 35 U.S.C. 154(b) by 0 days.

(21) Appl. No.: 09/371,676

(22) Filed: Aug. 10, 1999

Related U.S. Application Data

(63) Continuation-in-part of application No. 08/986,253, filed on Dec. 5, 1997, now Pat. No. 6,058,780.

(51) Int. Cl.⁷ ................................................. B28B 1/26
(52) U.S. Cl. ..................... 264/642; 264/651; 264/86; 264/87
(58) Field of Search ..................... 264/651, 86, 87, 264/642

(56) References Cited

U.S. PATENT DOCUMENTS

| | | |
|---|---|---|
| 3,232,114 A | 2/1966 | Ferran |
| 3,697,835 A | 10/1972 | Satori |
| 3,715,220 A * | 2/1973 | Confer et al. ............... 106/39 |
| 3,940,255 A | 2/1976 | Harrington et al. |
| 3,962,921 A | 6/1976 | Lips |
| 3,965,746 A | 6/1976 | Rabek |

(List continued on next page.)

FOREIGN PATENT DOCUMENTS

| | | | |
|---|---|---|---|
| EP | 0 473 109 | 3/1999 | |
| EP | 0 473 109 A3 | 3/1999 | |
| WO | Wo 98/41830 | 9/1998 | ............. G01L/9/00 |

OTHER PUBLICATIONS

Reed, Principles of Ceramics Processing, Second Edition, John Wiley & Sons, pp. 494–495, 1995.*

(List continued on next page.)

Primary Examiner—Christopher A. Fiorilla
(74) Attorney, Agent, or Firm—Keith Newburry, Esq.

(57) ABSTRACT

A dry pressing and slip casting process is provided for the manufacture of glass-ceramic components of the type used in sensors. Both process on starts with a powder composition of $SiO_2$ (42–59 wt. %), $Al_2O_3$ (17–35 wt. %), MgO (2–25 wt. %) and also BaO (0–20 wt. %), $TiO_2$ (0–12 wt. %), ZnO (0–10 wt. %), CaO (0–10 wt. %), $B_2O_3$ (0–5 wt %), $P_2O_5$ (0–5 wt. %), $ZrO_2$ (0–5 wt. %), alkali oxides such as $K_2O$, $Na_2O$ (0–3 wt. %) and other small amounts (0–1 wt. %) of additives such as $Fe_2O_3$, $As_2O_3$. $Fe_2O_3$, $V_2O_5$, $As_2O_3$. Some of the ingredients (e.g. Mg, Ba, Ca) can also be present in the form of fluoride, e.g., $MgF_2$, $BaF_2$, $CaF_2$, to up to 10 wt. %. Additional ceramic additives up to 30 wt. %, which are as second phase (e.g., $Al_2O_3$, $Y_2O_3$ doped $ZrO_2$, $SiO_2$, mullite, zircon, carbides, nitrides, and a combination of the above), are not part of the glass composition, but are introduced to enhance both the mechanical strength and toughness and to further modify the coefficient of thermal expansion. In the dry pressing process the powder is milled, blended with a binder and then subjected to a drying/granulation process. A die cavity of a desired shape is then filled with the powder. Pressure is then applied to die for a period of time. After the pressure is removed, the green ceramic part is ejected and then sintered to become a finished ceramic cover or header. In the slip casting process, the powder is milled and dispersed in a water. The slip is then poured or pumped into a permeable casting mold of a desired shape made of Gypsum. When either the liquid has been completely sucked away by the mold or the desired depositing thickness has been reached, the cast green ceramic part is removed from the mold, dried and then sintered into a finished ceramic cover or header.

29 Claims, 2 Drawing Sheets

U.S. PATENT DOCUMENTS

| | | | |
|---|---|---|---|
| 3,966,449 A | 6/1976 | Foster et al. ................... 65/43 |
| 4,101,952 A | 7/1978 | Burn | |
| 4,184,189 A | 1/1980 | Davis et al. | |
| 4,200,445 A | * 4/1980 | Bihuniak et al. .............. 65/18 |
| 4,221,047 A | 9/1980 | Narken et al. | |
| 4,364,883 A | * 12/1982 | Shannon ...................... 264/60 |
| 4,396,721 A | 8/1983 | Lawless | |
| 4,405,970 A | 9/1983 | Swindal et al. | |
| 4,422,335 A | 12/1983 | Ohnesorge et al. | |
| 4,426,673 A | 1/1984 | Bell et al. | |
| 4,460,622 A | 7/1984 | Yamaoka et al. ............. 427/79 |
| 4,609,966 A | 9/1986 | Kuisma | |
| 4,649,070 A | 3/1987 | Kondo et al. | |
| 4,689,999 A | 9/1987 | Shkedi | |
| 4,831,492 A | 5/1989 | Kuisma | |
| 4,876,892 A | 10/1989 | Arabia et al. | |
| 4,926,696 A | 5/1990 | Haritonidis et al. | |
| 4,998,179 A | 3/1991 | Grantham et al. | |
| 5,005,421 A | 4/1991 | Hegner et al. | |
| 5,049,421 A | 9/1991 | Kosh | |
| 5,050,035 A | 9/1991 | Hegner et al. | |
| 5,189,591 A | 2/1993 | Bernot | |
| 5,189,916 A | 3/1993 | Mizumoto et al. | |
| 5,211,058 A | 5/1993 | Fukiura et al. | |
| 5,250,474 A | 10/1993 | Siebers | |
| 5,317,919 A | 6/1994 | Awtrey | |
| 5,349,492 A | 9/1994 | Kimura et al. | |
| 5,440,931 A | 8/1995 | Wiegand et al. | |
| 5,446,616 A | 8/1995 | Warren | |
| 5,485,345 A | 1/1996 | Lukasiewicz et al. | |
| 5,486,976 A | 1/1996 | Charboneau et al. | |
| 5,499,158 A | 3/1996 | Bishop et al. | |
| 5,525,280 A | 6/1996 | Shukla et al. | |
| 5,528,452 A | 6/1996 | Ko | |
| 5,544,399 A | 8/1996 | Bishop et al. | |
| 5,578,528 A | 11/1996 | Wuu et al. | |
| 5,585,311 A | 12/1996 | Ko | |
| 5,740,594 A | 4/1998 | Lukasiewicz et al. | |
| 5,757,608 A | 5/1998 | Bernot | |
| 5,776,276 A | 7/1998 | Goebel et al. | |
| 5,801,313 A | 9/1998 | Horibata et al. | |
| 5,840,107 A | 11/1998 | Salibay .................... 106/180.1 |
| 5,922,271 A | * 7/1999 | Semar et al. ............... 264/602 |
| 5,954,850 A | 9/1999 | Bernot et al. | |
| 6,012,304 A | * 1/2000 | Loxley et al. ................ 65/111 |
| 6,248,680 B1 | 6/2001 | Xue et al. ..................... 501/15 |

OTHER PUBLICATIONS

International Search Report mailed Nov. 22, 2000.

Patent Abstracts of Japan Publication No. 05009039, Publication Date Jan. 19, 1993, Applicant Hoya Corp., Inventor Nishi Yoshikazu.

Marghussian V.K. et al.: "Fabrication of Cordierite Glass Ceramics by Slip Casting of Glass Powders", BR Ceram Trans; British Ceramic Transactions 1999 Inst Of Materials, London, Engl., vol. 98, No. 3, Jun. 1999; pp. 133–140, XP002152456, p. 133.

Kim B.H. et al: "Crystallization and Sinterability of Cordierite–Based Glass Powders Containing CeO2"; Journal of Materials Science, GB, Chapman and Hall Ltd. London, vol. 29, No. 24, Dec. 15, 1994, pp. 6592–6598, XP000484657 ISSN: 0022–2461, p. 6593, left–hand column.

Patent Abstracts of Japan Publication No. 01284726, Publication Date Nov. 16, 1989 Applicant Toyota Autom Loom Works Ltd., Inventor Shimazaki Kazunori.

Patent Abstracts of Japan Publication No. 01284727, Publication Date Nov. 16, 1989 Applicant Toyota Autom Loom Works Ltd., Inventor Miwa Makoto.

"A Glass–Based Capacitive Transducer," Apr. 1996.

* cited by examiner

GLASS-CERAMIC PRESSURE SENSOR SUPPORT BASE AND ITS FABRICATION

CROSS-REFERENCE TO RELATED APPLICATION

This application is a continuation-in-part of application Ser. No. 08/986,253, filed Dec. 5, 1997 that issued into Bernot et al. U.S. Pat. No. 6,058,780 on May 9, 2000.

TECHNICAL FIELD

This invention relates generally to glass-ceramic sensors and transducers and in particular to methods for making the glass-ceramic components of such sensors.

BACKGROUND OF THE INVENTION

Ohnesorge et al, U.S. Pat. No. 4,422,335 discloses a pressure transducer made using quartz plates and Bernot, U.S. Pat. No. 5,189,591 discloses a pressure transducer using alumino-silicate glass plates. Whether glass or quartz, these sensors have generally been mounted to headers made of aluminum or stainless steel. Besides being expensive to machine, another disadvantage to these aluminum and stainless steel headers is that it is difficult to hermetically seal the electrical connections to these sensors. Without a hermetic seal, liquid and gas contaminants in the sensing medium can enter and ruin the sensor. As a result these types of sensors can only be used where the pressure medium is contaminant free such as dry gasses.

A further advance in sensor technology is disclosed in Bernot et al, U.S. patent application Ser. No. 08/986,253, filed Dec. 5, 1997 now U.S. Pat. No. 6,058,780, entitled, (as amended), "Capacitive Pressure Having a Ceramic Base" which is assigned to the assignee of this application. This application discloses a sensor in which the prior art aluminum or stainless steel headers, (also referred to as bases), are replaced with a ceramic header and a cover that is either ceramic or metallic. The cover and header are sealed together with glass frit to define an interior chamber. A capacitive pressure sensor with alumino-silicate glass plates is mounted within the chamber.

Using a ceramic or glass-ceramic has the advantage that its coefficient of thermal expansion can be tailored through composition and firing condition modification to closely match the coefficient of thermal expansion of the aluminosilicate sensor glass plates. Further strengthening and toughening of the glass-ceramic can be achieved with the addition of second phase ceramic fillers. Several glass-ceramic materials have been used to fabricate prototype headers by machining. However, machining is a relatively expensive process.

Accordingly, there is a need for a more economical method of fabricating the sensor header and cover.

SUMMARY OF THE INVENTION

An object of the present invention is to provide a method for fabricating a sensor header or cover from a glass-ceramic.

The present invention accomplishes this object by providing a dry pressing process and a slip casting process for fabricating these glass-ceramic components. Both processes start with a powder composition of $SiO_2$ (42–59 wt. %), $Al_2O_3$ (17–35 wt. %), MgO (2–25 wt. %) and also BaO (0–20 wt. %), $TiO_2$ (0–12 wt. %), ZnO (0–10 wt. %), CaO (0–10 wt. %), $B_2O_3$ (0–5 wt %), $P_2O_5$ (0–5 wt. %), $ZrO_2$ (0–5 wt. %), alkali oxides such as $K_2O$, $Na_2O$ (0–3 wt. %) and other small amounts (0–1 wt. %) of additives such as $Fe_2O_3$, $V_2O_5$, $As_2O_3$. Some of the ingredients (e.g. Mg, Ba, Ca) can also be present in the form of fluoride, e.g., $MgF_2$, $BaF_2$, $CaF_2$, to up to 10 wt. %. Additional ceramic additives up to 30 wt. % which are as second phase (e.g., $Al_2O_3$, $Y_2O_3$ doped $ZrO_2$, $SiO_2$, mullite, zircon, carbides, nitrides, and a combination of the above), are not part of the glass composition, but are introduced to enhance both the mechanical strength and toughness and to further modify the coefficient of thermal expansion. In the dry pressing process the powder is milled, blended with a binder and then subjected to a drying/granulation process. A die cavity of a desired shape is then filled with the powder. Pressure is then applied to die for a period of time. After the pressure is removed, the green ceramic part is ejected and then sintered at high temperatures to become) a dense, finished ceramic cover or header.

In the slip casting process, the powder is milled and dispersed in water. The slip is then poured or pumped into a permeable casting mold of a desired shape made of gypsum. When either the liquid has been completely sucked away by the mold or the desired depositing thickness has been reached, the cast green ceramic part is removed from the mold after partial drying. After completely drying under controlled conditions, the green ceramic part can be sintered at high temperatures to become a finished ceramic cover or header.

These and other objects, features and advantages of the present invention are specifically set forth in or will become apparent from the following detailed description of a preferred embodiment of the invention when read in conjunction with the accompanying drawings.

DESCRIPTION OF THE PREFERRED EMBODIMENT

Bernot, U.S. Pat. No. 5,189,591 which issued on Feb. 23, 1993 and is assigned to AlliedSignal Inc. is hereby incorporated by reference. This patent discloses a capacitive pressure transducer having aluminosilicate glass plates.

Figure 1:
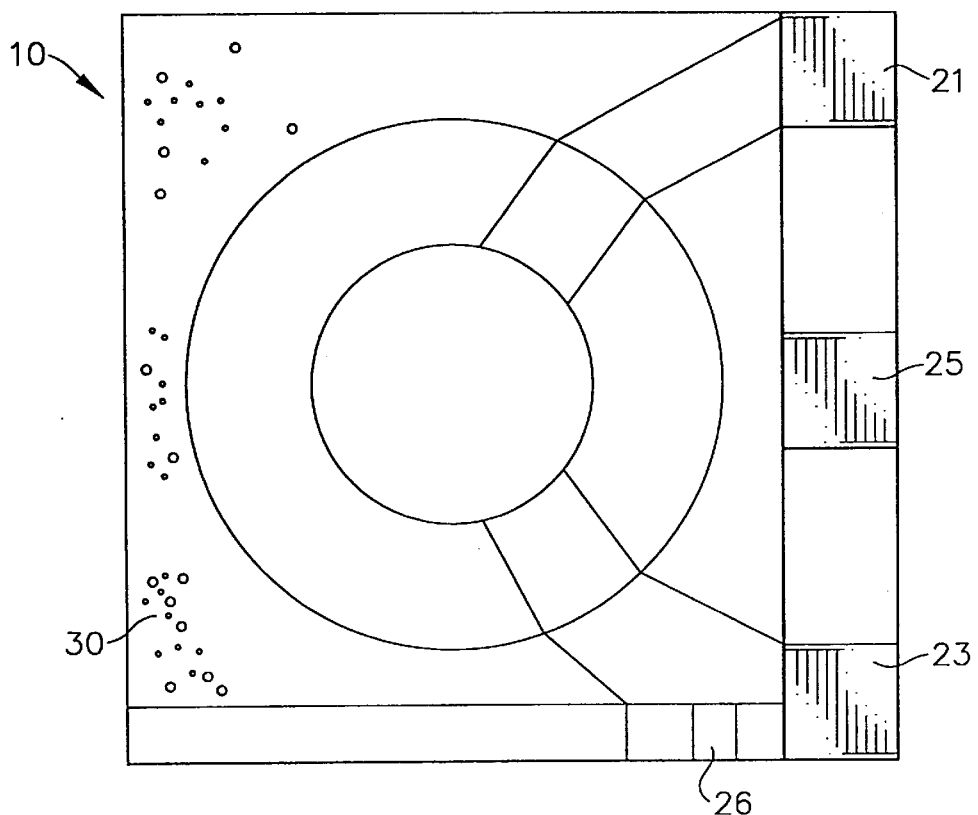
FIG. 1 is a top view of a glass pressure transducer.
Figure 2:
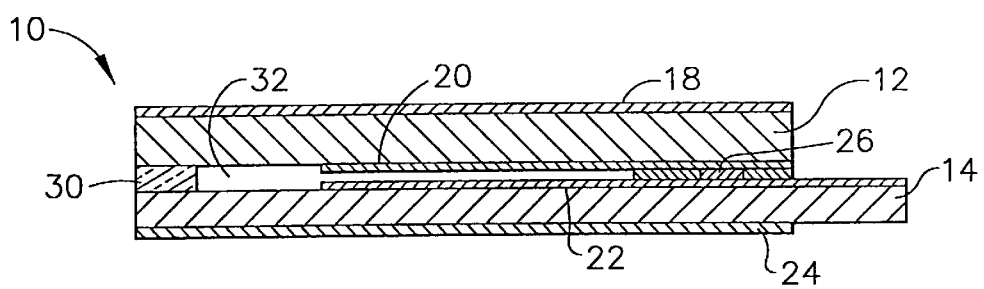
FIG. 2 is a side view of the pressure transducer of FIG. 1.

A glass pressure transducer 10 contemplated by the present invention is shown in FIGS. 1 and 2. The transducer or sensor 10 includes a top diaphragm 12 and a bottom diaphragm 14 which may be of different thickness made from a glass preferably aluminosilicate glass such CORNING #1723 or #1737F. Ground shields 18 and 24 are deposited on the outer surfaces of the diaphragms 12 and 14. Electrodes 20 and 22 are deposited in the inner surfaces of the diaphragms 12 and 14. A crossover metal tab 26 preferably made of silver acts as a conductor from the electrode 20 to a top electrode lead 21. Alternatively, the crossover tab 26 can be made from other metals such as platinum, palladium, or gold. The electrode 22 is connected to a bottom electrode lead 23. A ground lead 25 may also be added. The leads 21, 23, and 25 are preferably made of a noble metal, preferably platinum. Wires, not shown, may be connected to these leads. The geometry of the electrodes 20, and 22 can be round, square, or other shape. In addition the electrodes can be configured as multiple reference capacitor or pressure capacitors. The ground shields 18, 24 and the electrodes 20, 22 are made of a noble metal preferably platinum.

The diaphragms 12 and 14 are bonded together such that the electrodes 20 and 22 form a capacitor. The bond is formed by hydrate bonding, glass friting, or other adhesives. The frit glass 30 acts as a spacer between the diaphragms 12 and 14 and also as a seal to form a cavity 32 between the diaphragms. The cavity 32 can be evacuated to form either a vacuum, some other reference pressure, or left open for gauge pressure measurement.

Figure 3:
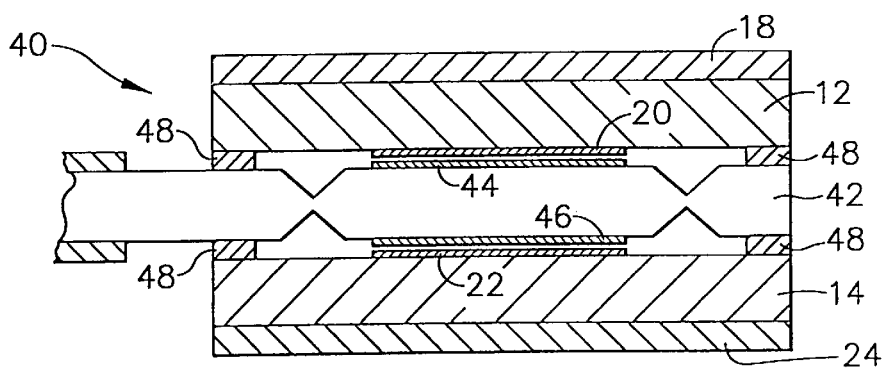
FIG. 3 is a side view of a glass accelerometer.

Referring to FIG. 3, a three piece glass accelerometer 40 can be formed from the pressure transducer 10 by mounting a glass, preferably aluminum silicate, seismic mass 42 between the top and bottom diaphragms 12,14. The seismic mass 42 has an electrode 44 in opposed relationship with electrode 20 and an electrode 46 in opposed relationship with electrode 22. The seismic mass 42 is bonded to the diaphragms 12,14 by frit 48 in such a way as to form cavity 49.

Figure 4:
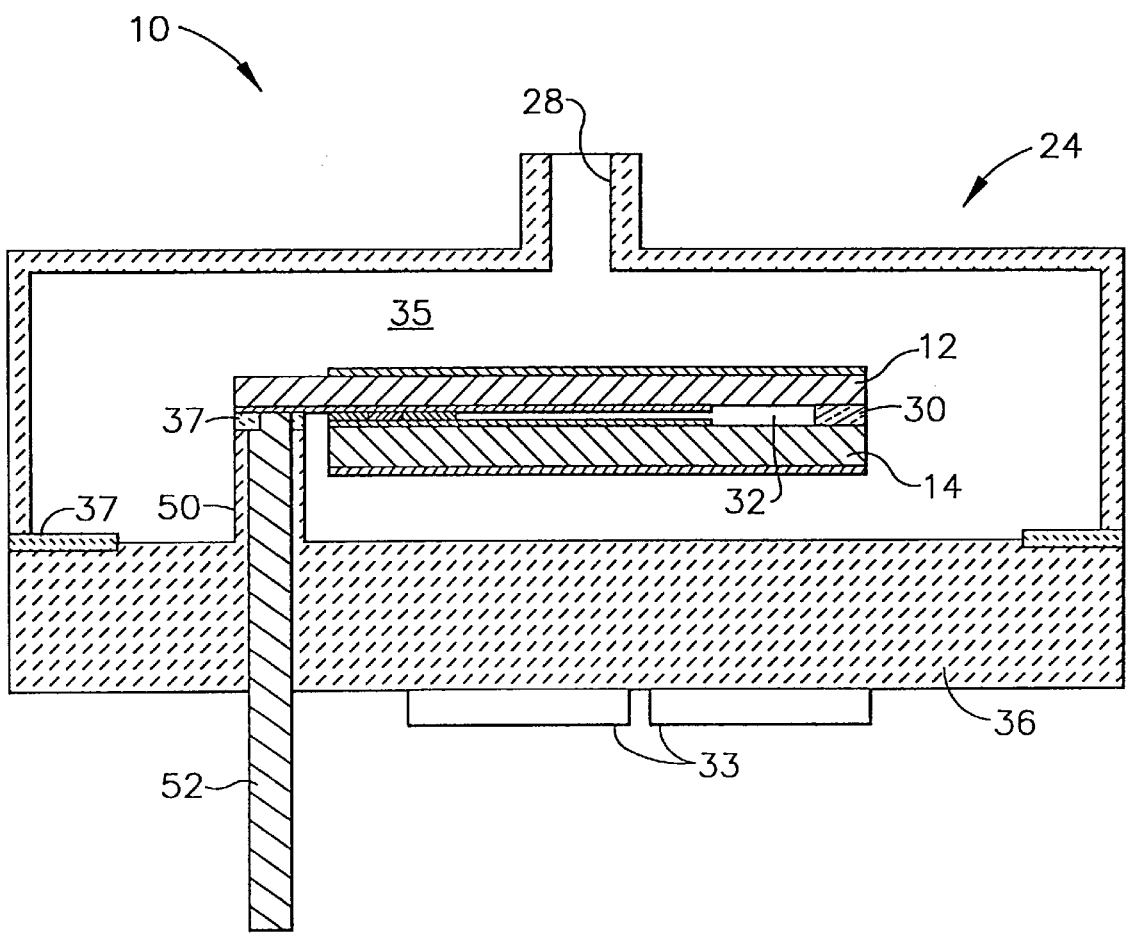
FIG. 4 is a schematic of the sensor of FIG. 1 mounted in a ceramic housing as contemplated by the present invention.

Referring to FIG. 4, the sensor 10 is mounted within a two part glass ceramic housing having a cover 24 and a header or base 36 that define an interior chamber 35. Alternatively, the cover 24 can be made of metal or polymer. The cover 24 and base 36 can be sealed together with glass or ceramic frit 37 or an organic adhesive or a mechanical sealing method. The cover 24 has a pressure inlet port 28 that is in fluid communication with a source of fluid pressure to be measured and with the chamber 35. In a manner familiar to those skilled in the art, the base 36 is mounted to electronic circuitry 33. The base 36 has at least one hole through the integral pillar 50 which extends into the chamber 35. The top diaphragm 12 is mounted to the end of the pillar 50 with glass or ceramic frit 37 or other adhesive. At least two metal conducting pins 52 or films, electrically connect top diaphragm 12 through the pillar 50 to the optional electronic circuitry 33 on the base 36. The cover 24 and base 36 can have a variety of shapes such as square, rectangular or circular.

The combination of the glass diaphragms and ceramic housing provides high accuracy over a wide range of temperature, because the thermal coefficient of expansion of glass and ceramic are matched. Hermetic sealing of the sensor electrical circuitry ensures long term compatibility with the sensed environment. Capsule mounting techniques minimizes mechanically induced stresses and hysteresis thus maximizing sensor performance. Thus the sensor is made more robust than those in the prior art and can be used with sensing mediums that contain gas or liquid contaminants.

One method of fabrication the cover 24 and header 36 is a dry pressing process that includes the following steps. A powder of the desired composition is selected. In the preferred embodiment, this powder comprises $SiO_2$ (42–59 wt. %), $Al_2O_3$ (17–35 wt. %), MgO (2–25 wt. %) and also BaO (0–20 wt. %), $TiO_2$ (0–12 wt. %), ZnO (0–10 wt. %), CaO (0–10 wt. %), $B_2O_3$ (0–5 wt %), $P_2O_5$ (0–5 wt. %), $ZrO_2$ (0–5 wt. %) alkali oxides such as $K_2O$, $Na_2O$ (0–3 wt. %) and other small amounts (0–1 wt. %) of additives such as $Fe_2O_3$, $As_2O_3$ and $V_2O_5$. Some of the ingredients, (e.g. Mg, Ba or Ca) can also be present in the form of fluoride, e.g., $BaF_2$, $CaF_2$, to up to 10 wt. %. Additional ceramic additives up to 30 wt. % which are as second phase (e.g., $Al_2O_3$, $Y_2O_3$ doped $ZrO_2$, mullite, zircon, carbides, nitrides and combinations thereof are not part of the composition, but are introduced to enhance both the mechanical strength and toughness and to further modify the coefficient of thermal expansion.

The powder is milled and then blended with a binder (e.g., polyvinyl alcohol, polyvinyl butyral, polyethylene glycol, cellulose, acrylic resins, waxes including microcrystalline wax such as Mobile RD55, the amount of binder being 1–8 wt %). The mixture is made more flowable by a drying/granulation process such as spray drying. A die cavity of a desired shape is then filled with the powder. Pressure is then applied to die in a uniaxial, preferably vertical, direction. The die transfers this pressure load onto the powder. The pressure is removed, the die opened, and the green (i.e. unfired) ceramic part is ejected. After a binder burnout step which is a firing at 400–600° C. in air, the green ceramic part can then be sintered at high temperatures to become a dense, finished ceramic cover 24 or header 36. Alternateively, the burnout step can be incorporated into the sintering step.

A second method of fabrication the cover 24 and header 36 is a slip casting process that includes the following steps. Starting with the same powder composition as in the dry pressing process previously described, the powder is first milled and dispersed in a liquid, preferably water, with the help of a dispersant or surfactant (preferably polyacrylate or polymethacrylate polymer based dispersant such as Darvan 821A or Darvan C, the amount of which being about 0.1 wt % to 2 wt %), and maybe an additional pH adjustment that is controlling the pH of the slip within the range of about 8 to 11, preferably with the addition of tetramethylammonium hydroxide or ammonium hydroxide. A binder may also be introduced at this point in the process. The slip is then poured or pumped into a permeable casting mold of a desired shape. Preferably the mold is made of gypsum. Capillary suction of the mold causes the liquid to be filtered from the suspending medium, resulting in a densely packed layer of particles deposited against the mold wall, thus forming a green part. External gas, air or nitrogen, prerssure can be applied to accelerate the process. When either the liquid has been completely sucked away by the mold or the desired depositing thickness has been reached (in the latter case any extra slip left over is immediately removed), the cast green ceramic part is removed from the mold for drying under controlled conditions first in a humidity controlled chamber such as a Blue M VaporTemp, chamber at 40° C. with 85% relative humidity). After completely drying under controlled conditions the green ceramic part can be sintered at high temperatures to become a dense, finished ceramic cover 24 or header 36.

EXAMPLE 1

A glass powder with composition of 49 wt. % $SiO_2$, 23 wt % $Al_2O_3$, 23 wt. % MgO, 2 wt. % $B_2O_3$, 2 wt % $P_2O_5$, and 1 wt. % $TiO_2$ was mixed with a small amount of $CaB_2O_4$ to make a mixture that contained 0.4 wt. % of the latter.

The powder mixture was processed and shaped into green sensor support bases by the dry pressing process described in the specification with the sintering at about 1050° C. for 1 hour to produce the final dense pressure sensor bases. In a second demonstration, this powder mixture was processed using the slip casting process described in the specification with the sintering at about 1050° C. for 1 hour to produce the final dense pressure sensor base. A number of prototype support bases made in accordance with the methods set forth in this example were proof tested in a pressure sensor assembly. This was done by mounting sensor glass capsules onto the bases using glass frit and testing them over the pressure range of 0–40 inches of mercury and the temperature range of −54 to 107° C., with high accuracy results.

EXAMPLE 2

A glass powder was composed of 45 wt. % $SiO_2$, 26 wt % $Al_2O_3$, 5 wt. % MgO, 18 wt. % BaO, 5 wt % ZnO, and 1 wt. % $TiO_2$ and was processed to produce green sensor bases and then sintered to obtain the final products using both processes as described in Example 1.

EXAMPLE 3

A glass powder with composition of 49 wt. % $SiO_2$, 28 wt % $Al_2O_3$, 16 wt. % MgO, 3 wt. % CaO, 1 wt. % $B_2O_3$, 1 wt % $P_2O_5$, 1 wt. % $TiO_2$ and 1 wt. % $ZrO_2$ was mixed with a small amount of $CaB_2O_4$ to make a mixture that contained 0.2 wt. % of the latter.

The material was processed to produce green sensor bases and then sintered to obtain the final products using both processes as described in Example 1.

EXAMPLE 4

A glass powder with composition of 51 wt. % $SiO_2$, 21 wt % $Al_2O_3$, 20 wt. % MgO, 1.8 wt. % $B_2O_3$, 1.8 wt % $P_2O_5$, 1.5 wt. % BaO, 1 wt % $K_2O$, 0.9 wt. % $TiO_2$, 0.5 wt % $Na_2O$ and 0.5 wt. % $Li_2O$ was processed to produce green sensor bases and then sintered to obtain the final products using both processes as described in Example 1.

EXAMPLE 5

A glass powder with composition of 49 wt. % $SiO_2$, 23 wt % $Al_2O_3$, 23 wt. % MgO, 2 wt. % $B_2O_3$, 2 wt % $P_2O_5$, and 1 wt. % $TiO_2$ was mixed with alumina ceramic powder to make a mixture that contained 10 wt. % alumina ceramic.

The mixture was processed to produce green sensor bases and then sintered to obtain the final products using both processes as described in Example 1, except that the maximum sintering temperature used was 1200° C.

Thus processes for the fabrication of ceramic or glass ceramic headers and covers for pressure sensors is provided that replaces the more expensive prior art processes that require machining and finishing operations.

Various modifications and alterations to the above-described preferred embodiment and examples will be apparent to those skilled in the art. Accordingly, these descriptions of the invention should be considered exemplary and not as limiting the scope and spirit of the invention as set forth in the following claims.

What is claimed is:

1. A method for forming a glass-ceramic article comprising the steps of:
    a) providing a glass powder having a composition of $SiO_2$ (42–59 wt. %), $Al_2O_3$ (17–35 wt. %), MgO (2–25 wt. %) and at least one additional oxide selected from $TiO_2$ and $ZrO_2$;
    b) mixing the glass powder with at least one additional second phase ceramic additive having a composition different from that of the glass powder to form a powder mixture;
    c) dispersing the powder mixture in a liquid to form a slip;
    d) moving the slip into a permeable casting mold having a desired shape;
    e) removing a cast green ceramic part from the mold;
    f) drying the green ceramic part; and
    g) sintering the green ceramic part until it forms a dense, finished glass-ceramic article.

2. The method of claim 1 wherein said liquid in step(c) is water.

3. The method of claim 1 wherein step (c) includes adding a dispersant or surfactant.

4. The method of claim 3 wherein step (c) includes the step of adding a pH adjustment.

5. The method of claim 1 further comprising the step of adding a binder after step (c).

6. The method of claim 1 wherein step (e) occurs after the liquid has been completely sucked away by the mold.

7. The method of claim 1 wherein step (e) occurs after a desired depositing thickness is reached.

8. The method of claim 7 further including the step of removing any excess slip.

9. The method of claim 1 further comprising after step (a) the step of milling the powder.

10. The method of claim 1 further comprising after step (d) the step of applying an external pressure to the mold to accelerate the casting process.

11. The method of claim 1 wherein the at least one second phase ceramic additive is introduced in a total amount up to 30 wt. %.

12. The method of claim 1, wherein the glass powder has a composition including $TiO_2$ in a positive amount up to about 12 wt. %.

13. The method of claim 1, wherein the glass powder has a composition including $ZrO_2$ in a positive amount up to about 5 wt %.

14. The method of claim 1, wherein the glass powder has a composition including $TiO_2$ and $Zro_2$.

15. The method of claim 1, wherein the composition of the glass powder further comprises at least one further additional oxide selected from the group consisting of BaO, ZnO, CaO, $B_2O_3$, and $P_2O_5$.

16. The method of claim 1, wherein the composition of the glass powder further comprises at least one further additional oxide selected from the group consisting of BaO in a positive amount up to about 20 wt. %, ZnO in a positive amount up to 10 wt %, CaO in a positive amount up to about 10 wt. %, $B_2O_3$ in a positive amount up to about 5 wt. %, and $P_2O_5$ in a positive amount up to about 5 wt. %.

17. The method of claim 1, wherein the at least one second phase ceramic additive is selected from the group consisting of $Al_2O_3$, $Y_2O_3$ doped $ZrO_2$, mullite, zircon, carbides, and nitrides.

18. A method for forming a glass-ceramic article comprising the steps of:
    a) providing a glass powder having a composition of $SiO_2$ (42–59 wt. %), $Al_2O_3$ (17–35 wt. %), MgO (2–25 wt. %) and at least one additional oxide selected from $TiO_2$ in a positive amount up to about 12 wt. % and $Zro_2$ in a positive amount up to about 5 wt. %;
    b) mixing the glass powder with at least one additional second ceramic additive having a composition different from that of the glass powder to form a powder mixture;
    c) dispersing the powder mixture in a liquid to form a slip;
    d) moving the slip into a permeable casting mold having a desired shape;
    e) removing a cast green ceramic part from the mold;
    f) drying the green ceramic part; and
    g) sintering the green ceramic part until it forms a dense, finished glass-ceramic article.

19. The method of claim 18, wherein the glass powder has a composition including $TiO_2$ in a positive amount up to about 12 wt. %.

20. The method of claim 18, wherein the glass powder has a composition including $ZrO_2$ in a positive amount up to about 5 wt %.

21. The method of claim 18, wherein the glass powder has a composition including $TiO_2$ in a positive amount up to about 12 wt. % and $ZrO_2$ in a positive amount up to about 5 wt. %.

22. The method of claim 18, wherein the composition of the glass powder further comprises at least one further additional oxide selected from the group consisting of BaO in a positive amount up to about 20 wt. %, ZnO in a positive amount up to 10 wt %, CaO in a positive amount up to about 10 wt. %, $B_2O_3$ in a positive amount up to about 5 wt. %, and $P_2O_5$ in a positive amount up to about 5 wt. %.

23. The method of claim 18, wherein the composition of the glass powder comprises $SiO_2$ (42–59 wt. %), $Al_2O_3$ (17–35 wt. %), MgO (2–25 wt. %), $TiO_2$ in a positive amount up to about 12 wt. %, $B_2O_3$ in a positive amount up to about 5 wt. %, and $P_2O_5$ in a positive amount up to about 5 wt. %.

24. The method of claim 18, wherein the composition of the glass powder comprises $SiO_2$ (42–59 wt. %), $Al_2O_3$ (17–35 wt. %), MgO (2–25 wt. %), $TiO_2$ in a positive amount up to about 12 wt. %, BaO in a positive amount up to about 20 wt. %, and ZnO in a positive amount up to about 10 wt. %.

25. The method of claim 18, wherein the composition of the glass powder comprises $SiO_2$ (42–59 wt. %), $Al_2O_3$ (17–35 wt. %), MgO (2–25 wt. %), $TiO_2$ in a positive amount up to about 12 wt. %, $ZrO_2$ in a positive amount up to about 5 wt. %, CaO in a positive amount up to about 10 wt. %, $B_2O_3$, in a positive amount up to about 5 wt. %, and $P_2O_5$ in a positive amount up to about 5 wt. %.

26. The method of claim 18, wherein the composition of the glass powder comprises $SiO_2$ (42–59 wt. %), $Al_2O_3$ (17–35 wt. %), MgO (2–25 wt. %), $TiO_2$ in a positive amount up to about 12 wt. %, $B_2O_3$ in a positive amount up to about 5 wt. %, $P_2O_5$ in a positive amount up to about 5 wt. %, and BaO in a positive amount up to about 5 wt. %.

27. The method of claim 18, wherein the composition of the glass powder comprises $SiO_2$ (42–59 wt. %), $Al_2O_3$ (17–35 wt. %), MgO (2–25 wt. %), $TiO_2$ in a positive amount up to about 12 wt. %, $B_2O_3$ in a positive amount up to about 5 wt. %, and $P_2O_5$ in a positive amount up to about 5 wt. %.

28. The method of claim 18, wherein the at least one second phase ceramic additive is introduced in a total amount up to 30 wt. %.

29. The method of claim 18, wherein the at least one second phase ceramic additive is selected from the group consisting of $Al_2O_3$, $Y_2O_3$ doped $ZrO_2$, mullite, zircon, carbides, and nitrides.

* * * * *